Figure 1:
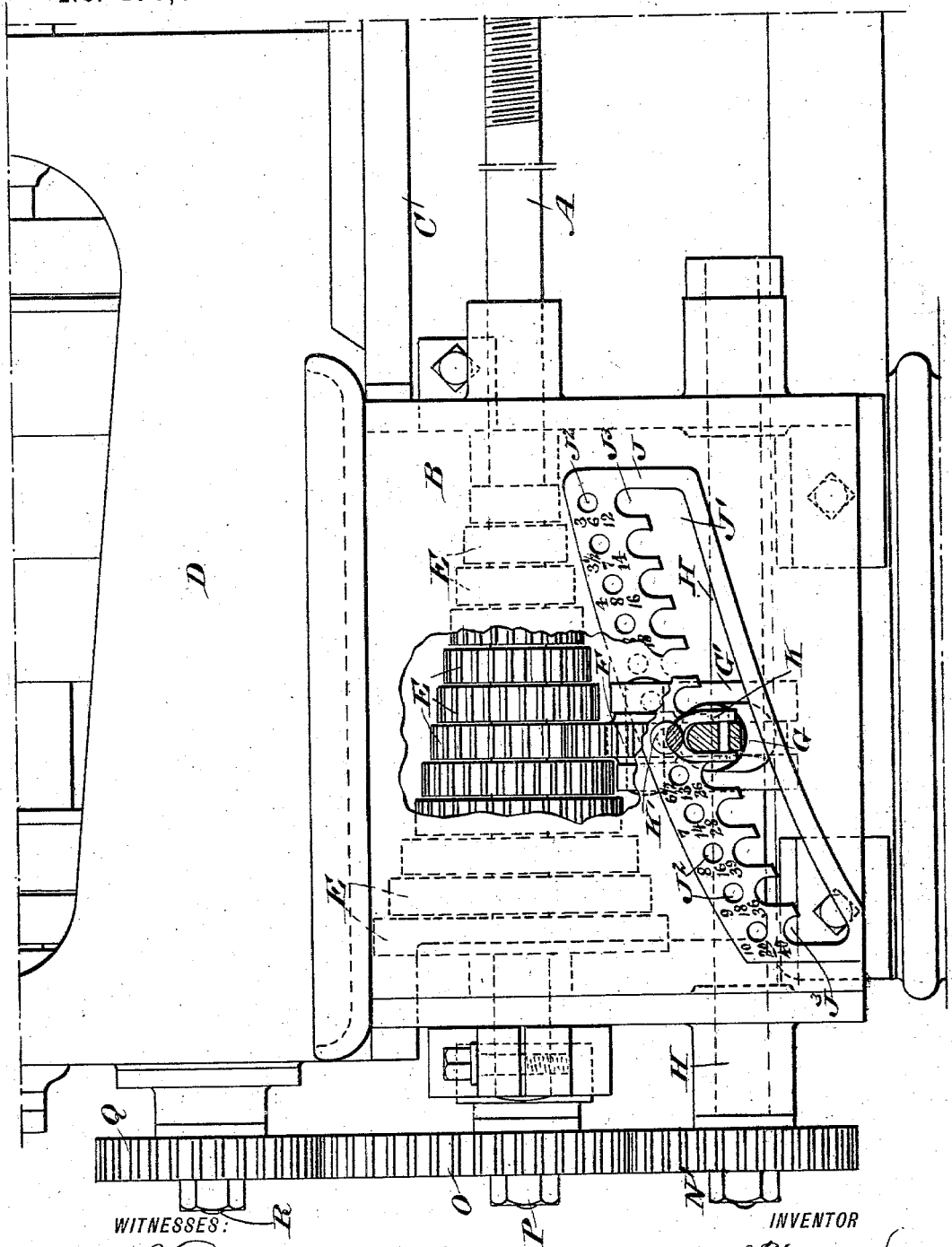

(No Model.) 2 Sheets—Sheet 1.

W. P. NORTON.
FEED MECHANISM FOR SCREW CUTTING LATHES.

No. 470,591. Patented Mar. 8, 1892.

WITNESSES:
Donn Twitchell
C. Sedgwick

INVENTOR
W. P. Norton
BY
Munn & Co
ATTORNEYS.

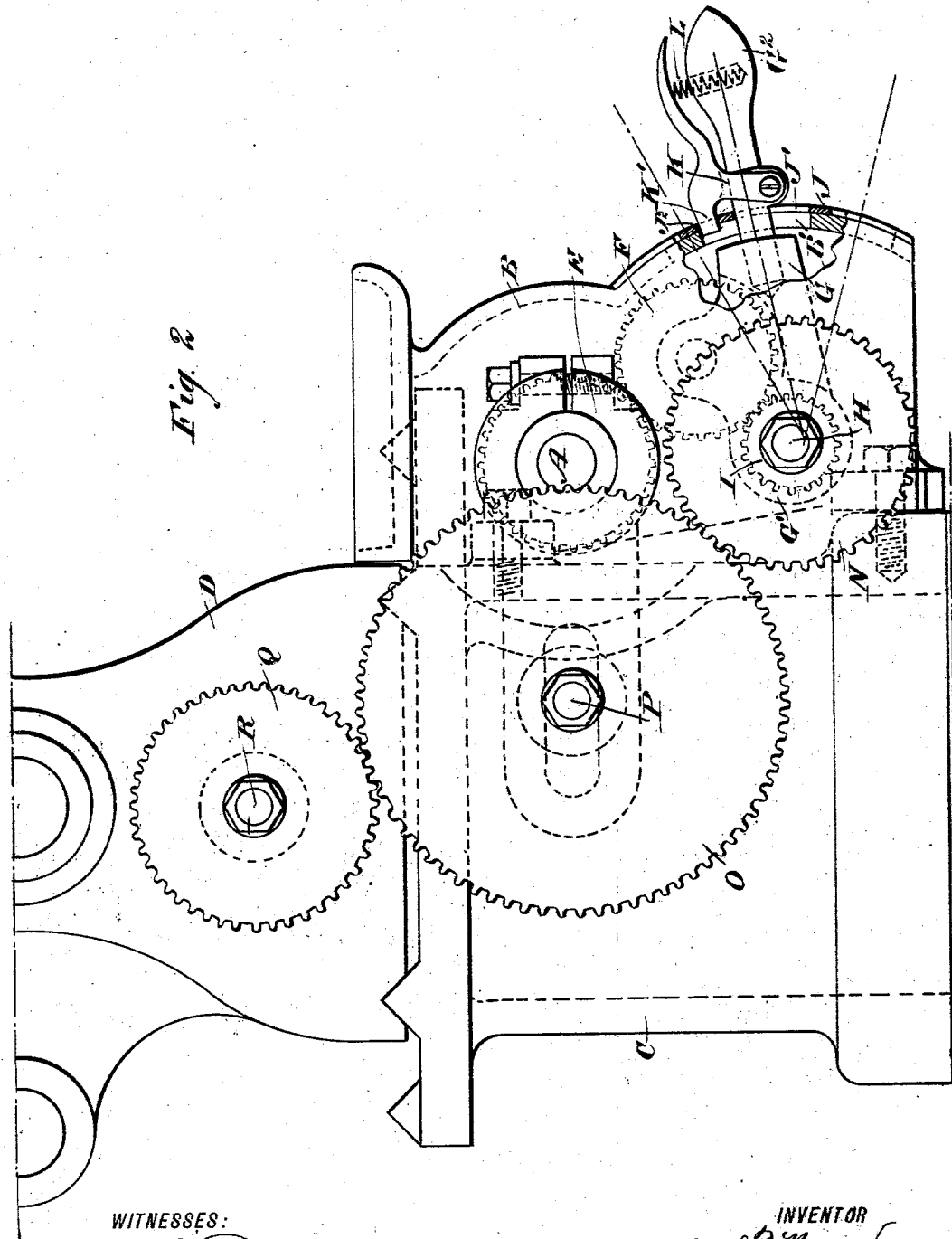

UNITED STATES PATENT OFFICE.

WENDELL P. NORTON, OF MOUNT VERNON, NEW YORK.

FEED MECHANISM FOR SCREW-CUTTING LATHES.

SPECIFICATION forming part of Letters Patent No. 470,591, dated March 8, 1892.

Application filed September 16, 1891. Serial No. 405,871. (No model.)

*To all whom it may concern:*

Be it known that I, WENDELL P. NORTON, of Mount Vernon, in the county of Westchester and State of New York, have invented a new and Improved Feed for Screw-Cutting Engine-Lathes, of which the following is a full, clear, and exact description.

The object of the invention is to provide a new and improved feed especially designed for use on screw-cutting engine-lathes to conveniently and rapidly change the speed of the feed-screw according to the requirements of the screw to be cut.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a front view of the improvement with parts broken out and parts in section, and Fig. 2 is an end elevation of the same with parts in section.

The feed-screw shaft A is mounted to turn in suitable bearings in a box B, attached to the frame C of the lathe near the head-stock D.

On the shaft A and within the box B are secured a series of gear-wheels E, of varying diameters, arranged step-like, as is plainly illustrated in Fig. 1. Each of the series of gear-wheels E is adapted to be engaged by a gear-wheel F, driven in the manner hereinafter described and designed to impart a rotary motion to the respective gear-wheel with which it is in mesh, so that the feed-screw is driven at a certain rate of speed, which latter varies according to the respective gear-wheel of the series of gear-wheels E with which the driving gear-wheel is in mesh. Thus if the gear-wheel F is rotated at a uniform rate of speed and meshes with one of the larger gear-wheels E the feed-shaft A is rotated at as low a rate of speed, and when the said gear-wheel F is in mesh with one of the smaller gear-wheels E the feed-shaft A is driven at a high rate of speed.

The driving gear-wheel F is mounted to turn in suitable bearings arranged on a lever G, formed with a forked end G', fulcrumed loosely on a shaft H, mounted to turn in suitable bearings held at the end of the box B. A pinion I is mounted to slide on and to turn with the shaft H, the latter being provided for this purpose with a longitudinal groove engaged by a key held in the said pinion. The latter is in mesh at all times with the driving gear-wheel F, so that when the shaft H is rotated a rotary motion is transmitted by the pinion I to the driving gear-wheel F, and the latter rotates the respective gear-wheel E it engages at the time. The pinion I is held between the prongs of the fork G' of the lever G, so that when the latter is moved longitudinally the said pinion, as well as the gear-wheel F, is carried along, it being understood that the lever G is then in a lowermost position, and the gear-wheel F is disengaged from the respective gear-wheel E. The handle end $G^2$ of the lever G projects through a slot B' in the front of the box B, and also through a slot J' in a plate J, secured to the front of the box B.

In the upper end of the plate J is arranged a series of openings $J^2$, adapted to be engaged by a pin K', projecting from a hand-lever K, fulcrumed on the handle end $G^2$ of the lever G. A spring L presses on the handle of the lever K to hold the pin K' in engagement with the respective opening $J^2$. In the top of the slot J' and directly below the openings $J^2$ are arranged semicircular recesses $J^3$, also adapted to be engaged by the pin K' when the lever G is in a lowermost position and the gear-wheel F is disengaged or out of mesh with the respective gear-wheel E. The slot J' and the openings $J^2$ are arranged in a curve extending upward and from left to right, as is plainly shown in Fig. 1. The openings $J^2$ correspond in number to the number of gear-wheels in the series of gear-wheels E, the said openings being arranged in line with the said gear-wheels, as is plainly shown in the said Fig. 1.

The lever G, its gear-wheel F, and the hand-lever K, with its pin K', are arranged in such a manner relative to the openings $J^2$ and the gear-wheels E that when the pin K' engages one of the openings $J^2$ the driving gear-wheel F is in mesh with the corresponding gear-wheel of the series of gear-wheels E in line with the said opening J². In a like manner when the lever G is in a lowermost position and the pin K' engages one of the notches J³, then the lever G is held in a locked position on the plate J with the driving gear-wheel F disengaged from the series of gear-wheels E, but arranged directly opposite the gear-wheel corresponding to the respective notch J³, engaged by the pin K'. When the operator presses on the handle of the hand-lever K, the pin K' is thrown out of engagement with the respective opening J² or the notch J³, and the operator, by moving the handle end G² downward, throws the gear-wheel F out of engagement with the series of gear-wheels E. When the lever G is in this position, it can be readily moved to the right or left by the operator exerting a corresponding pressure on the handle end G², so that the lever G is moved to the right or left, being guided by its handle G² in the slot J' until the gear-wheel F is opposite the gear-wheel of the series of gear-wheels E to be engaged in order to drive the speed-shaft A at the proper speed. As soon as the lever G is in the proper position the operator moves the handle end G² of the lever G upward to engage the pin K', with the opening J² arranged opposite the gear-wheel E to be engaged. This upward movement of the lever G throws the gear-wheel F into mesh with the desired gear-wheel of the series of gear-wheels E, and at the same time the pin K' engages the corresponding opening J², and the handle end G² rests in the corresponding notch J³ in the top of the slot J'. The lever G is then locked in position with the gear-wheel F in mesh with the desired gear-wheel of the series of gear-wheels E.

On one outer end of the shaft H is secured a gear-wheel N, in mesh with an intermediate gear-wheel O, mounted to turn on a stud P, held transversely adjustable in the frame C of the lathe. The intermediate gear-wheel O is in mesh with the gear-wheel Q, held on the shaft R, mounted to turn in the head-stock D, and driven by suitable connection with the main spindle of the lathe. The gear-wheels N, O, and Q are made interchangeable, and may also be substituted by others differing in size from those shown, so that the shaft H may be given any desired speed, whereby a variation of speed can be given to the screw-shaft A of the gear-wheels E by means of the driving gear-wheel F.

In order to quickly indicate the speed to be given to the feed-shaft A, the plate J is provided with graduations along each opening J², indicating the corresponding feed.

The top of the box B is preferably made with a recess, forming a rest for tools, oil-cans, &c., as is plainly shown.

Having thus described my invention, I claim as new and desire to secure by Letters Patent—

1. In a device of the class described, the combination, with a series of interchangeable gear-wheels, of a shaft driven from the said series of interchangeable gear-wheels, a pinion mounted to turn with and to slide on the said shaft, a driving gear-wheel in mesh with the said pinion, and a second series of gear-wheels of various diameters arranged step-like on the feed-shaft and adapted to be engaged by the said driving gear-wheel, substantially as shown and described.

2. In a device of the class described, the combination, with a series of interchangeable gear-wheels, of a shaft driven from the said series of interchangeable gear-wheels, a pinion mounted to turn with and to slide on the said shaft, a driving gear-wheel in mesh with the said pinion, a second series of gear-wheels of various diameters arranged step-like on the feed-shaft and adapted to be engaged by the said driving gear-wheel, and a lever carrying the driving gear-wheel and arranged for shifting the said pinion on the said shaft and moving the driving gear-wheel in and out of mesh with the feed-shaft gear-wheels, substantially as shown and described.

3. In a device of the class described, the combination, with a series of interchangeable gear-wheels, of a shaft driven from the said series of interchangeable gear-wheels, a pinion mounted to turn with and to slide on the said shaft, a driving gear-wheel in mesh with the said pinion, a second series of gear-wheels of various diameters arranged step-like on the feed-shaft and adapted to be engaged by the said driving gear-wheel, a lever carrying the driving gear-wheel and arranged for shifting the said pinion on the said shaft and moving the driving gear-wheel in and out of mesh with the feed-shaft gear-wheels, and a locking mechanism for the said lever, substantially as shown and described.

4. In a device of the class described, the combination, with a series of interchangeable gear-wheels, of a shaft driven from the said series of interchangeable gear-wheels, a pinion mounted to turn with and to slide on the said shaft, a driving gear-wheel in mesh with the said pinion, a second series of gear-wheels of various diameters arranged step-like on the feed-shaft and adapted to be engaged by the said driving gear-wheel, a lever carrying the driving gear-wheel and arranged for shifting the said pinion on the said shaft and moving the driving gear-wheel in and out of mesh with the feed-shaft gear-wheels, and a plate having a curved slot forming a guide for the said lever, substantially as shown and described.

5. In a device of the class described, the combination, with a series of interchangeable gear-wheels, of a shaft driven from the said series of interchangeable gear-wheels, a pinion mounted to turn with and to slide on the said shaft, a driving gear-wheel in mesh with the said pinion, a second series of gear-wheels of various diameters arranged step-like on the feed-shaft and adapted to be engaged by the said driving gear-wheel, a lever carrying the driving gear-wheel and arranged for shifting the said pinion on the said shaft and moving the driving gear-wheel in and out of mesh with the feed-shaft gear-wheels, a plate having a curved slot forming a guide for the said lever, and a mechanism for locking the said lever to the said plate, substantially as shown and described.

6. In a device of the class described, a box forming a cover for the feed-shaft, gear-wheels and the driving gear-wheel for the said feed-shaft, gear-wheels, bearings formed in the said box for the feed-shaft and the driving-shaft, and an index-plate held on the said box and close to an inclined slot in the front of the said box, substantially as shown and described.

7. In a device of the class described, the combination, with a series of interchangeable gear-wheels, of a shaft driven from the said series of interchangeable gear-wheels, a pinion mounted to slide on and to turn with the said shaft, a lever fulcrumed loosely on the said shaft and adapted to carry along the said pinion, a driving gear-wheel in mesh with the said pinion and mounted to turn on the said lever, a series of gear-wheels of varying diameters and arranged in step form on the feed-shaft, each of the said series of gear-wheels being adapted to be engaged by the driving gear-wheel, a hand-lever pivoted on the said lever and formed with a pin and a plate formed with a slot, and a series of openings adapted to be engaged by the said pin, substantially as shown and described.

8. In a device of the class described, the combination, with a series of gear-wheels arranged in step form on the feed-shaft, of a driving gear-wheel adapted to engage each of the said gear-wheels in the series of gear-wheels, a lever carrying the said driving gear-wheel, and a plate formed with a curved slot through which passes the said lever for guiding the same, substantially as shown and described.

9. In a device of the class described, the combination, with a series of gear-wheels arranged in step form on the feed-shaft, of a driving gear-wheel adapted to engage each of the said gear-wheels in the series of gear-wheels, a lever carrying the said driving gear-wheel, a plate formed with a curved slot through which passes the said lever for guiding the same, and a locking mechanism for locking the said lever on the said plate, substantially as shown and described.

WENDELL P. NORTON.

Witnesses:
J. L. McAULIFFE,
EDGAR TATE.